(12) United States Patent  (10) Patent No.: US 9,193,294 B1
Egigian  (45) Date of Patent: Nov. 24, 2015

(54) TIE-DOWN FIXTURE

(71) Applicant: Donald S. Egigian, Boerne, TX (US)

(72) Inventor: Donald S. Egigian, Boerne, TX (US)

( * ) Notice: Subject to any disclaimer, the term of this patent is extended or adjusted under 35 U.S.C. 154(b) by 223 days.

(21) Appl. No.: 13/719,010

(22) Filed: Dec. 18, 2012

(51) Int. Cl.
   *B60P 7/08* (2006.01)
(52) U.S. Cl.
   CPC *B60P 7/0807* (2013.01); *B60P 7/08* (2013.01)
(58) Field of Classification Search
   CPC ........... B60P 7/08; B60P 7/0807; F16G 11/04
   USPC ......... 410/101, 102, 106, 107, 109, 110, 111, 410/112, 116; 24/265 CD, 115 K; 248/499
   See application file for complete search history.

(56) References Cited

U.S. PATENT DOCUMENTS

| | | | |
|---|---|---|---|
| 3,623,690 A | 11/1971 | Bergman, Jr. | |
| 3,779,502 A | 12/1973 | Marberg | |
| 4,991,271 A | 2/1991 | Bauer et al. | |
| 5,273,382 A | 12/1993 | Yearick | |
| D408,267 S * | 4/1999 | Egigian et al. | |
| 5,971,684 A | 10/1999 | Wang | |
| 6,113,328 A * | 9/2000 | Claucherty | 410/106 |
| 6,464,437 B1 | 10/2002 | Elwell | |
| 6,969,219 B2 | 11/2005 | Speece et al. | |
| 2012/0181816 A1 | 7/2012 | Jutila et al. | |

* cited by examiner

*Primary Examiner* — Stephen Gordon

(74) *Attorney, Agent, or Firm* — Patent Law & Venture Group

(57) ABSTRACT

A fastener for securing straps, includes a base member defining a pair of anchor receiving holes, wherein the base member is configured to be engaged with a receiving frame in such a way that the base member faces an interior side of the receiving frame and axes of the anchor receiving holes define a non-normal angle with respect to the receiving frame. The fastener further includes an anchor comprising a pair of arms, wherein the arms are received by the anchor receiving holes, wherein the anchor is configured to traverse along the anchor receiving holes without being disengaged from the base member.

6 Claims, 8 Drawing Sheets

Section A-A

TIE-DOWN FIXTURE

BACKGROUND

1. Field

The disclosed subject matter relates to the field of fasteners that facilitate securing of loads, and more particularly but not exclusively to fasteners that have retractable members.

2. Discussion of Related Field

Fasteners for securing lines are commonly referred to as tie down anchor assemblies. Such tie down anchor assemblies are known to be used in trailers or pickup trucks to secure loads. An anchor provided in a tie down anchor assembly may be configured to be retracted when not in use and to be extended when the tie down assembly is used to secure lines. In pickup trucks, tie down anchor assemblies are engaged with side walls of a truck bed. A load, such as a box, placed on the truck bed, is secured at a desired position on the truck bed using the tie down anchor assemblies which engage lashings or lines.

It has been observed that conventional anchors extend from the truck wall with a perpendicular orientation to the side wall to which the tie down anchor is engaged. However, most often the axes of the tie down straps have a substantially large angle with the axis along which the anchor traverses, which results in undesirable strain in the tie down assembly, thereby negatively affecting the longevity of the tie down assembly.

In light of the foregoing discussion, there is a need for a fastener with enhanced longevity, which can facilitate securing of loads.

SUMMARY

An embodiment provides a fastener to facilitate securing a load. The fastener includes a base member having a pair of anchor receiving holes, wherein the base member is configured to be engaged with a receiving frame such as the sidewall of a pickup truck and faces the interior of the truck's utility bed. The receiving frame provides anchor receiving holes set at an upward angle relative to the horizontal. The fastener further includes a U-shaped anchor bar having a pair of legs received by the anchor receiving holes, and wherein the anchor bar is able to traverse along the anchor receiving holes without being disengaged from the base member. In this way the anchor bar may be withdrawn to provide clearance in the truck bed and alternately may be extended for gripping a line, a rope, a lashing cord and other means for tying down a load in the truck bed.

BRIEF DESCRIPTION OF THE DRAWINGS

Embodiments are illustrated by way of example in the Figures of the accompanying drawings, in which like references indicate similar elements and in which.

DETAILED DESCRIPTION

The following detailed description includes references to the accompanying drawings, which form a part of this detailed description. The drawings show illustrations in accordance with example embodiments. These example embodiments are described in enough detail to enable those skilled in the art to practice the present subject matter. However, it will be apparent to one of ordinary skill in the art that the present invention may be practiced without these specific details. In other instances, well-known methods, procedures and components have not been described in detail so as not to unnecessarily obscure aspects of the embodiments. The embodiments can be combined, other embodiments can be utilized or structural and logical changes can be made without departing from the scope of what is defined and claimed. The following detailed description is, therefore, not to be taken as a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Figure 1A:
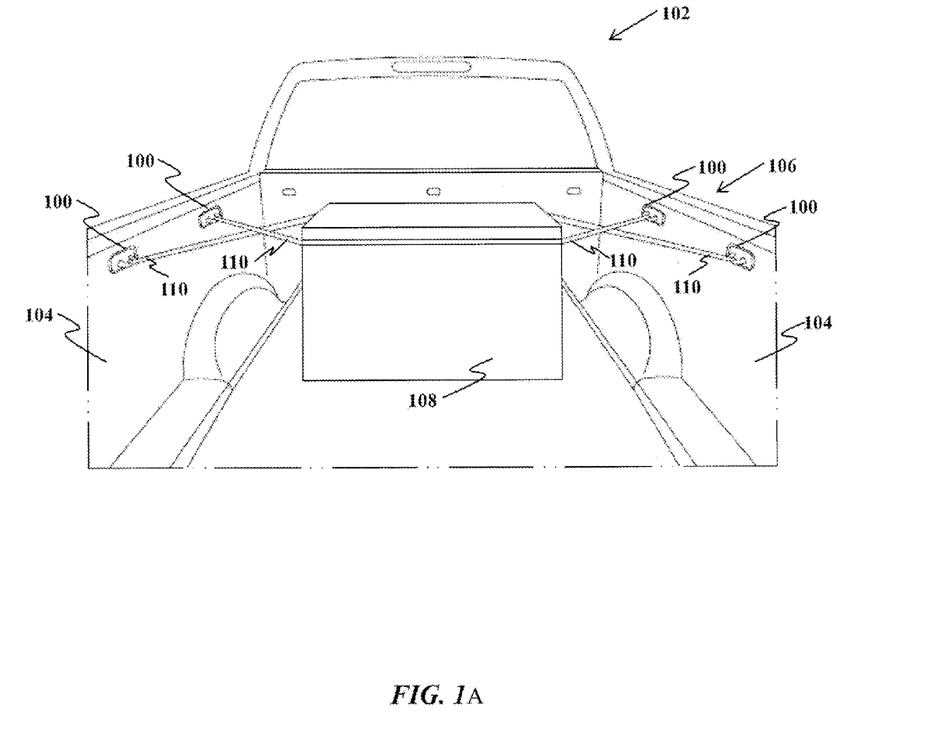
FIG. 1A is an example perspective rear view of a pickup truck, in accordance with an embodiment.

Embodiments disclose a fastener that can facilitate securing lines for holding loads in place. FIG. 1A is an example perspective view of fasteners 100 configured with a pickup truck 102, in accordance with an embodiment. The fasteners 100 are configured to mount in frames 104, such as sidewalls of a truck bed 106. A load 108 placed in the truck bed 106 is secured at a desired position by engaging straps 110 with the load 108 and the fasteners 100.

Figure 1B:
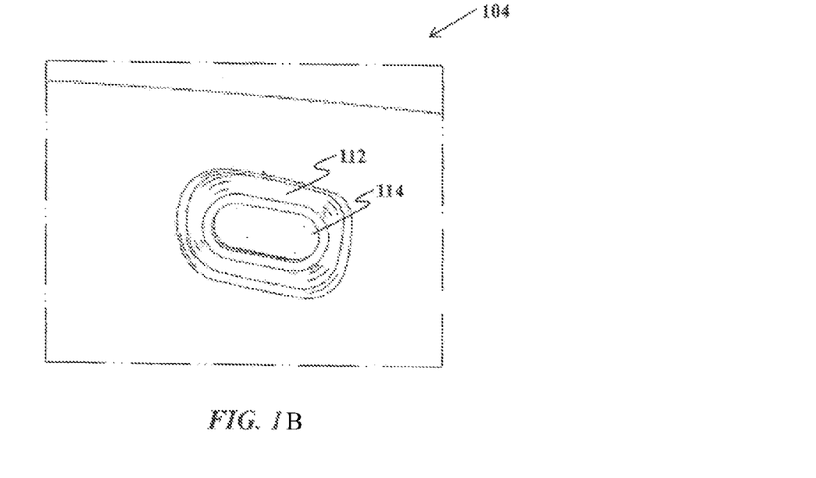
FIG. 1B is a partial side view of a truck wall with a recess for mounting a fastener.

FIG. 1B is an example of a receiving frame 104, in accordance with an embodiment. The receiving frame 104 defines a depressed portion 112 and an opening 114. The depressed portion 112 and the opening 114 facilitate mounting of fastener 100 to the receiving frame 104.

Figure 1C:
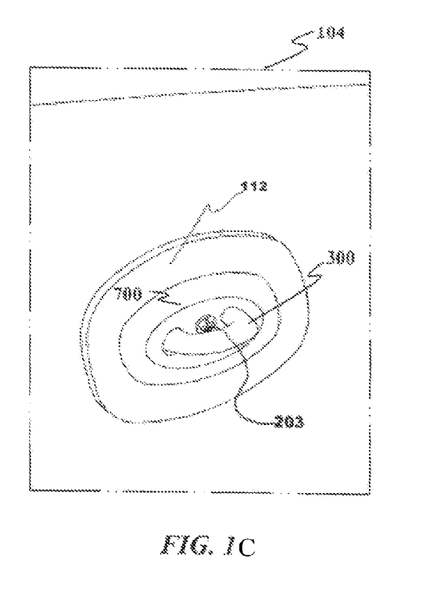
FIG. 1C is the partial side view of the truck wall with a fastener mounted in the recess with an anchor bar of the fastener shown in a recessed position.
Figure 1D:
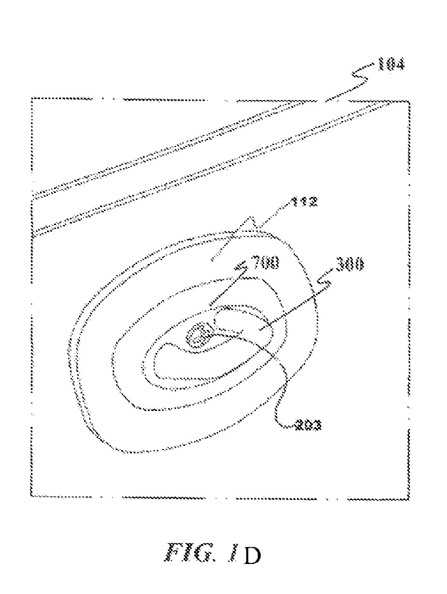
FIG. 1D is the partial side view of the truck wall with the fastener mounted in the recess with the anchor bar of the fastener shown in an extended position.

In an embodiment, the fastener 100 includes a base member 200, an anchor 300 and an outer cover 700. The anchor 300 is configured to be retracted when the fastener 100 is not used to grip straps 110 and to extend when the fastener 100 is used to facilitate gripping straps 110. FIGS. 1C and 1D are example perspective views of the anchor 300 in retracted position and extended position, respectively, in accordance with an embodiment.

Figure 2A:
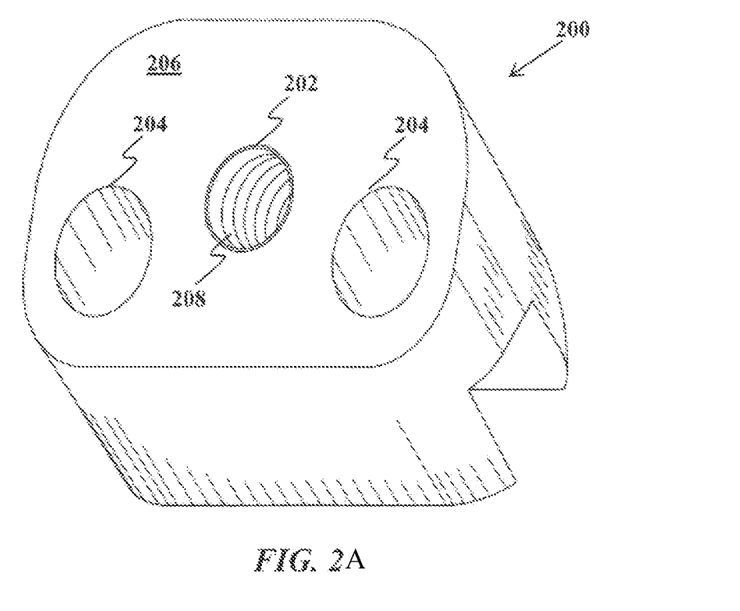
FIG. 2A is an example frontal perspective view of a base member of the fastener, in accordance with an embodiment.
Figure 2B:
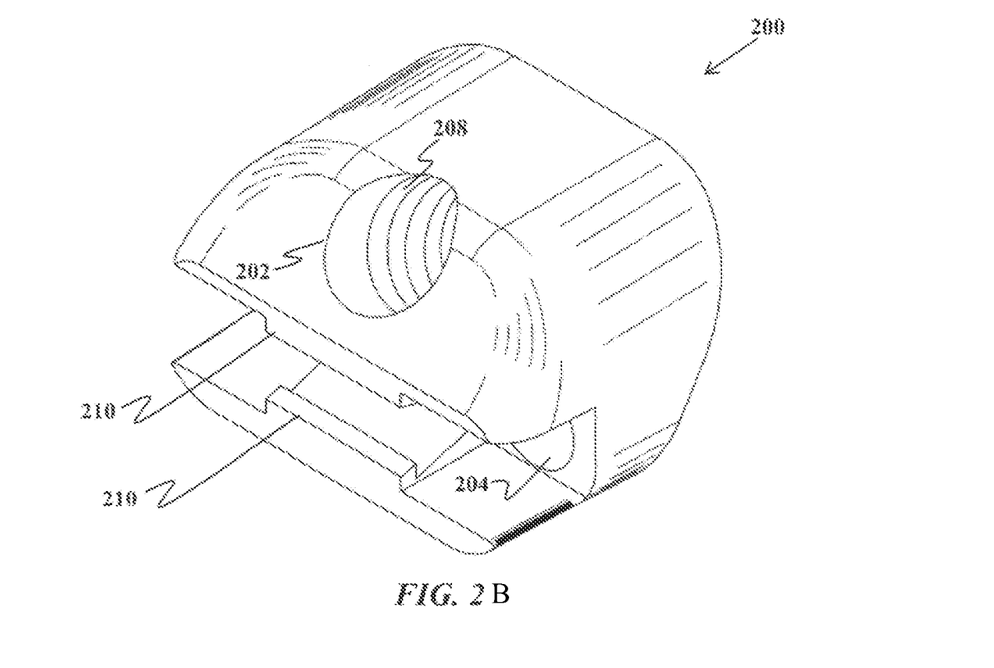
FIG. 2b is an example rear perspective view of the base member of the fastener, in accordance with an embodiment.
Figure 8:
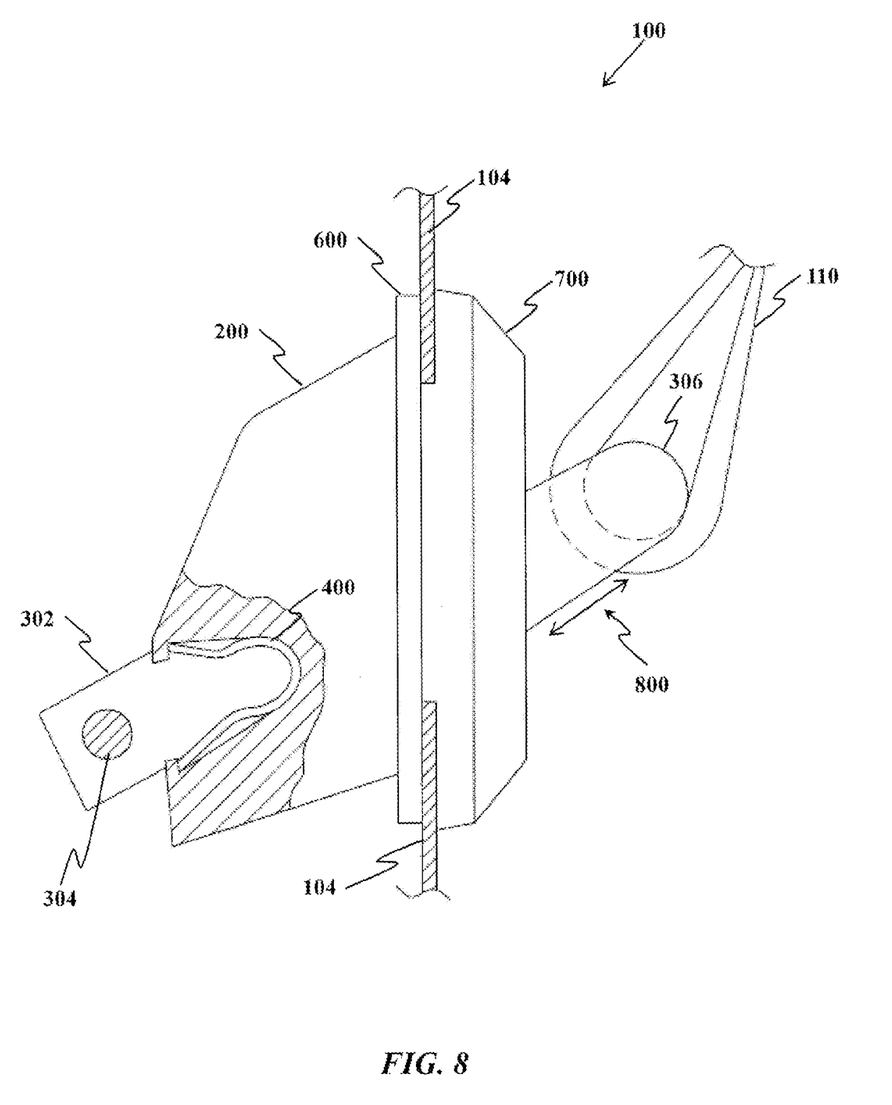
FIG. 8 is an example side view of the fastener as mounted to a receiving frame, in accordance with an embodiment.

FIG. 2a and FIG. 2b are example perspective views of the base member 200, in accordance with an embodiment. The base member 200 is configured to be engaged with the receiving frame 104 within depressed portions 112. The base member 200 is positioned on an interior side of receiving frame 104 as shown in FIG. 8.

The base member 200 defines a mounting hole 202, which is threaded 208. The mounting hole 202 facilitates engagement of the base member 200 with the receiving frame 104. In an embodiment, the mounting hole 202 receives a bolt 203 (FIGS. 1C, 1D), thereby enabling the base member 200 to be secured to the receiving frame 104. The base member 200 can be engaged in such a way that a surface 206 of the base member 200 faces an interior side of the receiving frame 104.

Figure 3:
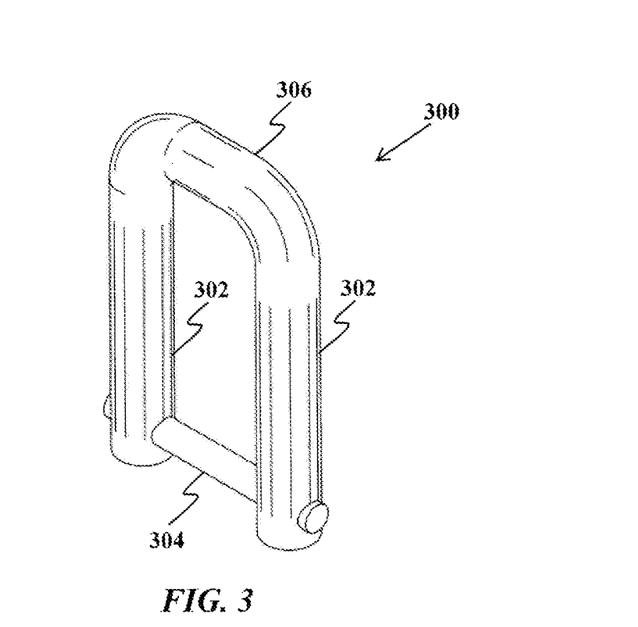
FIG. 3 is an example perspective view of the anchor bar of the fastener, in accordance with an embodiment.

The base member 200 further defines a pair of anchor receiving holes 204. The anchor receiving holes 204 receive arms of anchor 300 as best shown in FIG. 8. FIG. 3 is an example perspective view the anchor 300, in accordance with an embodiment. The anchor 300 includes a pair of arms 302, an joining portion 306 continuous between the arms 302 and a block member 304 which may be a separate removable pin. The anchor receiving holes 204 receive the arms 302. Once the arms 302 are passed through the anchor receiving holes 204, block member 304 can be engaged with the anchor 300, thereby preventing the anchor 300 from being disengaged from the base member 200. It shall be noted that, in an embodiment not shown, a separate block member may be engaged with each one of the arms 302, such that each of the block members prevents the anchor 300 from being disengaged from the base member 200. In an embodiment not shown, each one of the block members has a length that is greater than the diameter of an anchor receiving hole 204. The aforementioned engagement of the anchor 300 with the base member 200 enables the anchor 300 to perform a sliding movement within the anchor receiving holes 204. It shall be noted that, when the fastener 100 is positioned for attachment to a line 110, the anchor 300 can be positioned in its extended aspect as shown in FIG. 1D. On the other hand, when the fastener 100 is not engaged with line 110, anchor 300 may be pushed back in to its recessed position, thereby leaving only a part of the anchor 300 visible as shown in FIG. 1C.

Figure 4:
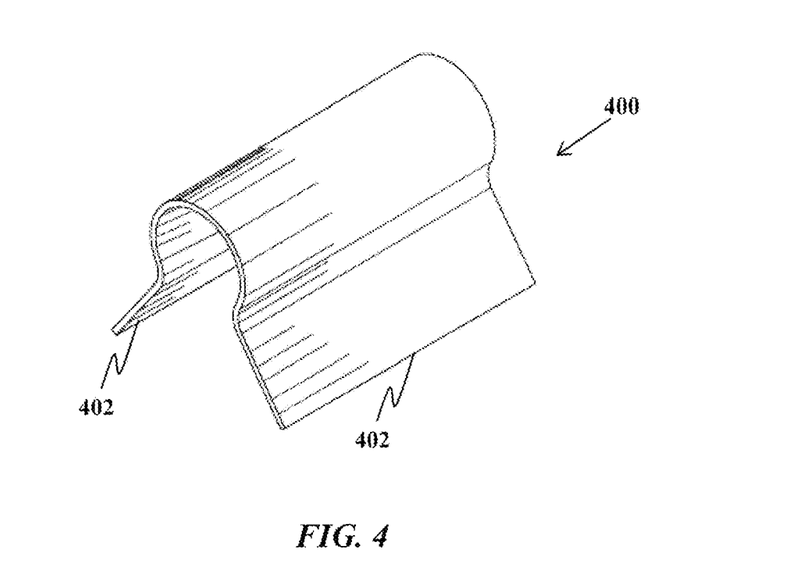
FIG. 4 is an example perspective view of a spring of the fastener, in accordance with an embodiment.

In an embodiment, base member 200 is configured to receive a spring 400. FIG. 4 is an example perspective view of spring 400. The spring 400 may be a "V" shaped spring with edges 402, which are received by the base member 200 as shown in FIG. 5B. The base member 200 has projections 210, against which the edges 402 of the spring 200 rest, thereby facilitating holding of the spring 400 at a desired location within the base member 200. The spring 400 receives the block member 304 of the anchor 300, in order to hold anchor 300 in its extended position.

Figure 5A:
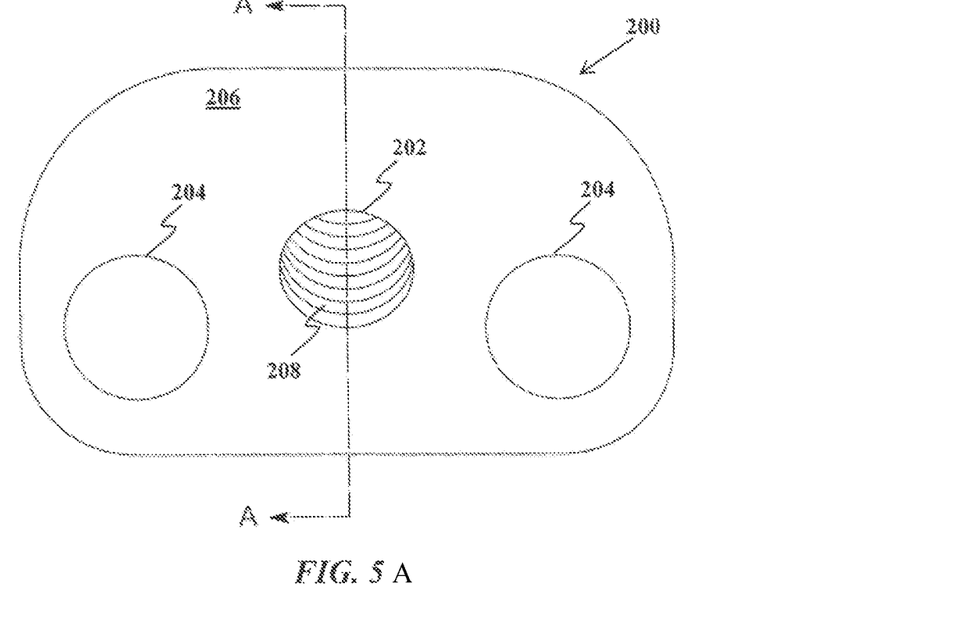
FIG. 5A is an example front elevational view of the base member, in accordance with an embodiment.
Figure 5B:
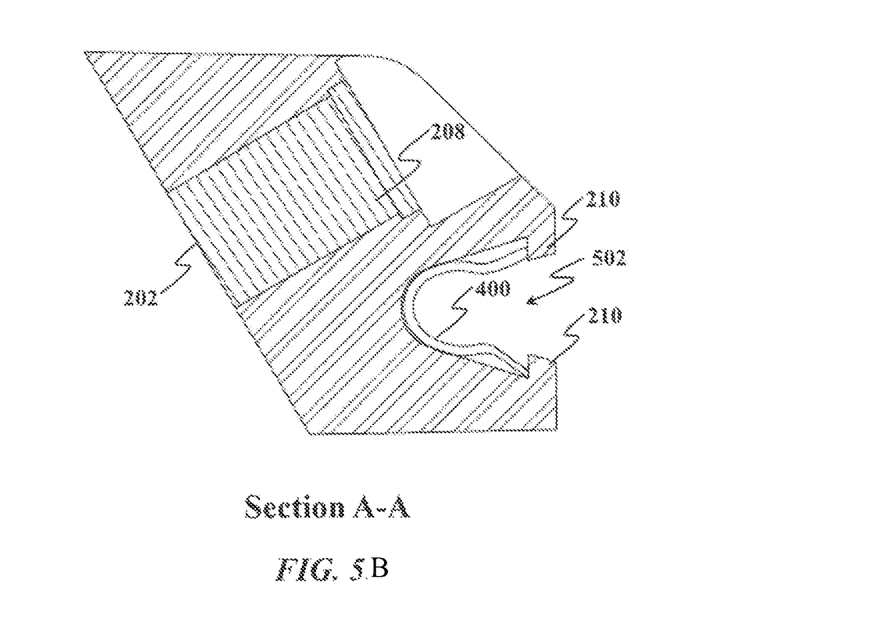
FIG. 5B illustrates an example sectional view taken along cutting plane line A-A of FIG. 5A, in accordance with an embodiment.

FIG. 5A is an example frontal perspective view of the base member 200, in accordance with an embodiment. FIG. 5B is a sectional view taken along line A-A in FIG. 5A, of the base member 200 in accordance with an embodiment. As can be seen in this figure, the base member 200 defines a spring receiving space 502, which is configured to receive the spring 400.

In an embodiment, when the base member 200 is engaged with the receiving frame 104, in this case the vehicle's side wall (FIG. 8), the alignment of the anchor receiving holes 204 are such that, the axes of the anchor receiving holes 204 define a non-orthogonal angle with the plane of the receiving frame 104. This angle is such that joining portion 306 of anchor 300 rises in its elevation as it is pulled out for use. The angle at which anchor 300 is situated within base member 200 may match the angle of straps 110 relative to the horizontal. Such an alignment of the holes 204 reduces undesirable stress experienced by fastener 100, thereby positively affecting the useful life of fastener 100. This is because the straps 110 may be cinched to a relatively high tension.

Figure 6:
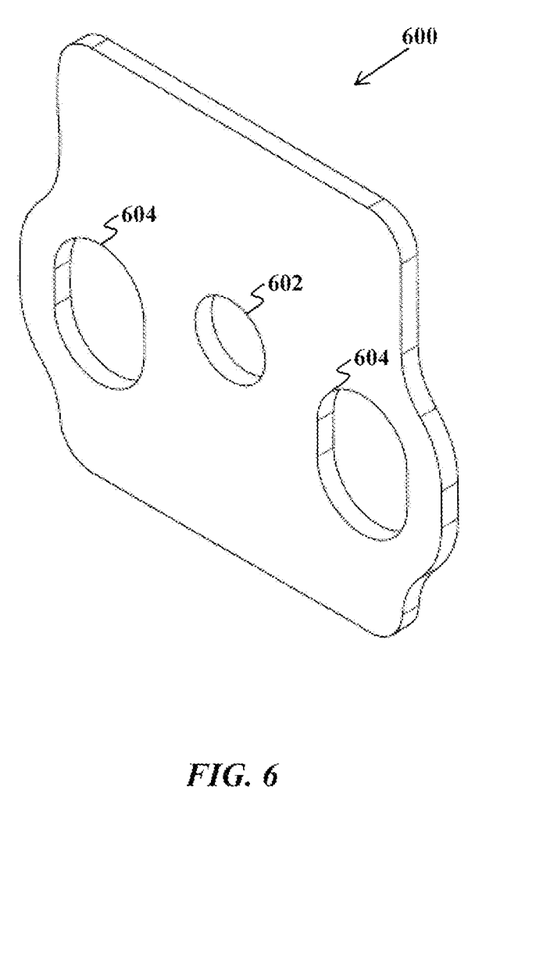
FIG. 6 is an example perspective view of a plate of the fastener, in accordance with an embodiment.

In an embodiment, fastener 110 may further include a plate 600. FIG. 6 is an example perspective view of such a plate 600, in accordance with an embodiment. The plate 600 may define hole 602 and a pair of anchor accommodating holes 604. The plate 600 is positioned between the base member 200 and the receiving frame 104. The hole 602 receives the bolt 203 which passes through and is threaded into the mounting hole 202. Anchor accommodating holes 604 receive the arms of the anchor 300, which pass through the anchor receiving holes 204.

Figure 7A:
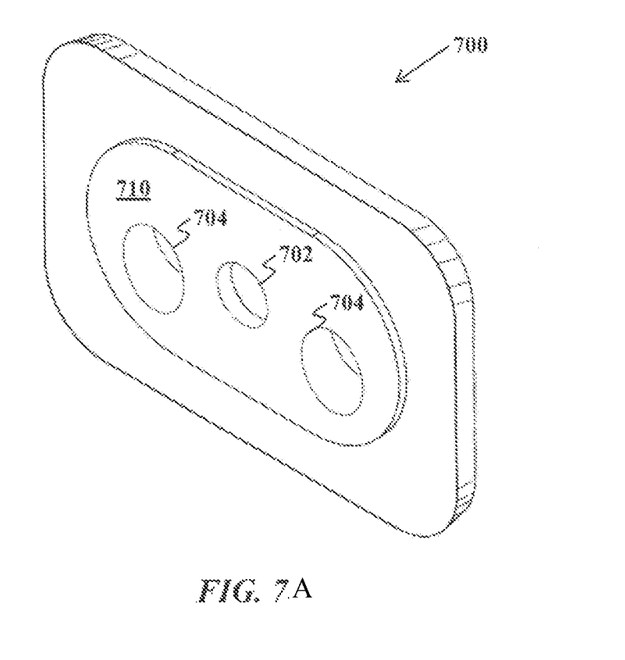
FIG. 7A is an example rear perspective view of an outer cover of the fastener, in accordance with an embodiment.
Figure 7B:
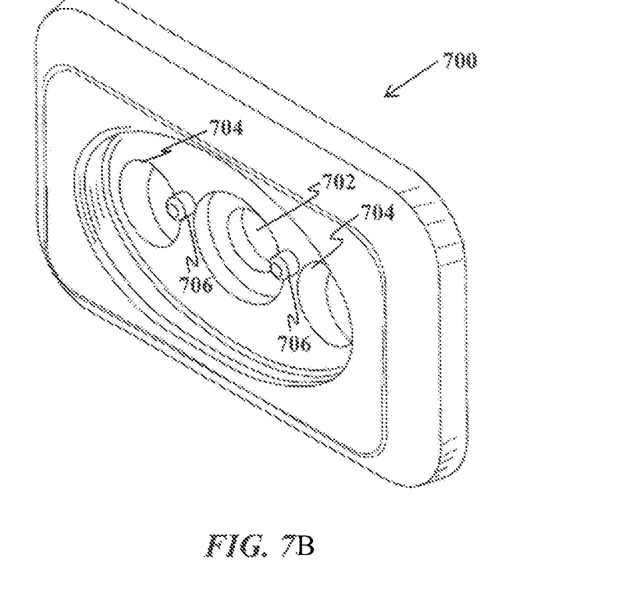
FIG. 7B is an example frontal perspective view of the outer cover of the fastener, in accordance with an embodiment.

In an embodiment, the fastener 100 includes an outer cover 700. FIG. 7A and FIG. 7B are example perspective views of an outer cover 700, in accordance with an embodiment. The outer cover 700 is engaged to the receiving frame 104 such that the truck bed side of receiving frame 104 faces the cover 700. When the fastener 100 is assembled, the receiving frame 104 is sandwiched between the base member 200 and the cover 700. The cover 700 defines an engagement member reception hole 702 and a pair of anchor arm reception holes 704. The engagement member reception hole 702 receives the bolt 203 passing through the mounting hole 202 and the anchor arm reception holes 704 receive the arms of the anchor 300, which pass through the anchor receiving holes 204. When the fastener is assembled, the axis of the engagement member reception hole 702 is along the axis of the mounting hole 202. Further, axes of the anchor arm reception holes 704 are along the axes of the respective anchor receiving holes 204.

In an embodiment, a back surface 708 of the outer cover 700 has a protruding portion 710. The protruded portion 710 is received by an opening defined in the receiving frame 104. This prevents fastener 100 from rotating after being mounted in place, a critical enablement.

In an embodiment, the outer cover includes at least one projection element. In FIG. 7B, a pair of projection elements 706 are illustrated. The projection elements 706 ensure that a gap exists between the anchor 300 and the outer cover 700 when the anchor 300 is retracted, thereby enabling a user to have finger space for gripping joining portion 306 to conveniently pull the anchor 300 out when need arises.

FIG. 8 is an example side view of the fastener 100 engaged with the receiving frame 104, in accordance with an embodiment. The arms 302 of the anchor 300 are configured to traverse along the directions indicated by arrow 800.

In the foregoing description, processes are described as a sequence of steps, this is solely for the sake of illustration. Accordingly, it is contemplated that some steps may be added, some steps may be omitted, the order of the steps may be re-arranged, or some steps may be performed simultaneously.

What is claimed is:

1. A fastener comprising:
   a base member having a pair of anchor receiving holes;
   a U-shaped anchor having a pair of arms, said arms slidingly engaged within said anchor receiving holes and movable therein between a withdrawn position and an extended position;
   said pair of arms joined at ends thereof by a block member;
   a V-shaped spring having edges engaged by projections of said base member wherein said V-shaped spring is secured within said base member; and
   said block member engaged with said V-shaped spring when said pair of arms is in said extended position, and disengaged from said V-shaped spring when said pair of arms is in said withdrawn position.

2. The fastener according to claim 1, further comprising an outer cover in contact with a receiving frame in positional opposition to said base member and a plate.

3. The fastener according to claim 1, further comprising a plate in contact with said base member for contacting and spacing apart said base member from a receiving frame.

4. The fastener according to claim 2, wherein said outer cover has a pair of anchor arm reception holes aligned with said anchor receiving holes for receiving said pair of anchor arms.

5. The fastener according to claim 2, wherein said outer cover has a projecting element enabling a finger space when said U-shaped anchor is retracted.

6. The fastener according to claim 2, wherein said base member has a mounting hole and said outer cover has a reception hole aligned with said mounting hole for securing said base member and said outer cover to said receiving frame.

\* \* \* \* \*